United States Patent Office 3,265,720
Patented August 9, 1966

3,265,720
MANUFACTURE OF DIBASIC LEAD PHTHALATE
Thomas Richard Barrow, Tynemouth, Northumberland, England, assignor to Associated Lead Manufacturers Limited, London, England, a British company
No Drawing. Filed Sept. 23, 1963, Ser. No. 310,882
Claims priority, application Great Britain, Sept. 21, 1962, 36,049/62
5 Claims. (Cl. 260—435)

It is known to prepare dibasic lead phthalate as described in British specification No. 588,717, by reaction of phthalic anhydride with litharge in the presence of water and in the presence of an acid as a catalyst. This known process involves solution of the phthalic anhydride in a large quantity of water heated almost to boiling point, reaction for a period of as long as six hours and filtration of the reaction product.

The present invention provides an improved process, in which the reaction is completed in from two to three hours and which comprises mixing in a mixer litharge and phthalic anhydride, as dry powders and in quantities which are approximately stoichiometric for the production of dibasic lead phthalate, with sufficient water to produce a workable paste, heating the mixture to a temperature between 75° and 100° C. with continued stirring and addition of further water in an amount sufficient merely to keep the mixture at an acceptable soft consistency and finally discharging the paste from the mixer and drying and powdering it without filtration.

Preferably the water first added to the mixer includes an acid catalyst which forms a basic lead salt which is soluble in water, into which the litharge is progressively converted and which reacts with the phthalic anhydride to form dibasic lead phthalate. Thus acetic acid, formic acid or propionic acid may be used as the catalyst. The mixture of water and catalyst added to the mixed powders may also contain a wetting agent and the mixture may conveniently be heated to 75°–80° C.

Examples (1) In a typical works charge 1,836 lb. calcined litharge and 402 lb. powdered phthalic anhydride were weighed into a Baker-Perkins Z-blade mixer. The dry powders were thoroughly mixed and 80 gallons of water containing 1 gallon of 80% acetic acid and 150 ml. Teepol 514 (a long chain alkyl sulphate) were then added. At this stage steam was turned on and the jacket of the mixer allowed to warm up. More water was added to soften the paste and soon the reaction became quite vigorous. In all, a further 47 gallons of water were used. Eventually the mixture became quite pale and then almost white after which it was mixed for a further hour. The paste was discharged into trays, dried in a gas oven and powdered.

(2) The procedure of Example 1 was followed, but the initial charge of 80 gallons of water contained no acetic acid or other acid catalyst and contained ¼ lb. of ammonium stearate instead of Teepol as the wetting agent. The conditions were otherwise identical.

(3) The procedure of Example 1 was again followed, but the initial charge of 80 gallons of water contained 400 ccs. of 5% acetic acid and the wetting agent consisted of ¼ lb. of potassium stearate. The conditions were otherwise identical.

(4) Ammonium stearate was made by mixing ¼ lb. of stearic acid with 1 pint of water, adding approx. 100 ccs. of .880 ammonia and stirring vigorously.

816 lbs. of Canary litharge and the above quantity of ammonium stearate were charged into a Baker-Perkins Z-bladed jacketed pulper; 60 gallons of water were added, very carefully, in approx. 5 gallon lots. Great care was taken to avoid the formation of any aggregates of dry undispersed litharge. The mixture was ground for 20 minutes to this stage to ensure complete dispersion.

180 lbs. of powdered phthalic anhydride were then added, together with 200 ccs. of 5% acetic acid.

The lid of the pulper was then closed and steam turned on the jacket.

The reaction began when the temperature reached 75° to 80° C., and after 2½ hours the reaction was complete.

The batch was partially dried in the pulper and then discharged into trays and dried in a drying oven.

When dry the material was pulverized.

What I claim as my invention and desire to secure by Letters Patent is:

1. A process for the preparation of dibasic lead phthalate which comprises mixing in a mixer litharge and phthalic anhydride as dry powders and in quantities which are approximately stoichiometric with sufficient water to produce a workable paste, heating the mixture for a period of two to three hours to a temperature between 75° C. and 100° C. with continued stirring and addition of further water in an amount sufficient merely to keep the mixture at an acceptable smooth consistency and finally discharging the paste from the mixer and drying and powdering it without filtration.

2. A process as claimed in claim 1, in which the water first added to the mixer includes an acid catalyst selected from the group consisting of formic acid, acetic acid and propionic acid.

3. A process as claimed in claim 2, in which the acid catalyst is acetic acid.

4. A process as claimed in claim 1, in which the water first added to the mixer contains a wetting agent selected from the group consisting of long chain alkyl sulphates, ammonium stearate and potassium stearate.

5. A process as claimed in claim 1, in which the mixture is heated to 75–80° C.

No references cited.

TOBIAS E. LEVOW, *Primary Examiner.*

E. C. BARTLETT, H. M. S. SNEAD, *Examiners.*